United States Patent
Kawasaki (10) Patent No.: US 9,148,568 B2
(45) Date of Patent: Sep. 29, 2015

(54) IMAGE-STABILIZATION APPARATUS AND CAMERA

(71) Applicant: RICOH IMAGING COMPANY, LTD., Tokyo (JP)

(72) Inventor: Gaku Kawasaki, Kanagawa (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 14/053,962

(22) Filed: Oct. 15, 2013

(65) Prior Publication Data

US 2014/0104446 A1  Apr. 17, 2014

(30) Foreign Application Priority Data

Oct. 17, 2012  (JP) ................................ 2012-229893

(51) Int. Cl.
  *H04N 5/228* (2006.01)
  *H04N 5/232* (2006.01)
  *G02B 27/64* (2006.01)

(52) U.S. Cl.
  CPC .......... *H04N 5/23248* (2013.01); *G02B 27/646* (2013.01); *H04N 5/23258* (2013.01)

(58) Field of Classification Search
  CPC .................................................. H04N 5/2254
  USPC .......................................... 348/208.4–208.6
  See application file for complete search history.

(56) References Cited

U.S. PATENT DOCUMENTS

| 6,408,135 | B1 | 6/2002 | Imada |
| 7,505,217 | B2 | 3/2009 | Uenaka |
| 2007/0196086 | A1 | 8/2007 | Ishikawa |
| 2008/0013937 | A1 | 1/2008 | Uenaka |
| 2010/0134639 | A1 | 6/2010 | Takeuchi |
| 2010/0253792 | A1* | 10/2010 | Kawaguchi et al. ....... 348/208.2 |

FOREIGN PATENT DOCUMENTS

| JP | 2000-122106 | 4/2000 |
| JP | 2000-284337 | 10/2000 |
| JP | 2006-039183 | 2/2006 |
| JP | 2006-084540 | 3/2006 |
| JP | 2008-020703 | 1/2008 |

OTHER PUBLICATIONS

Search Report from European Patent Office (EPO), mail date is Jun. 3, 2014.

* cited by examiner

*Primary Examiner* — Joel Fosselman (74) *Attorney, Agent, or Firm* — Greenblum & Bernstein, P.L.C.

(57) ABSTRACT

An image-stabilization apparatus is provided that includes an image stabilizer and a status-determining processor. The image stabilizer counterbalances a camera shake in accordance with sensor signals from a shake-detecting sensor. The status-determining processor determines whether a status of the camera is in a fixed state or in a unstable state on the basis of the signals. The status determination process is carried out at the time of exposure and the characteristics of an image-stabilizing operation are altered according to the results of the status determination process.

16 Claims, 7 Drawing Sheets

IMAGE-STABILIZATION APPARATUS AND CAMERA

BACKGROUND OF THE INVENTION

1. Field of the Invention

The present invention relates to an image-capturing apparatus provided with an image-stabilization apparatus, and more particularly, to an image-stabilization apparatus that alters a drive mode according to whether the image-capturing apparatus is in fixed state or not. Further, the invention relates to a camera provided with such image-stabilization apparatus.

2. Description of the Related Art

The image-stabilization apparatus shakes a correction lens or an image sensor in accordance with signals from angular velocity sensors to counterbalance or compensate for a camera shake. However, signals from an angular velocity sensor generally include an offset and it is not favorable to keep the image-stabilization apparatus in operation when the camera is in a fixed state. Accordingly, there is provided a camera that uses signals from the angular velocity sensors to determine whether or not it is fixed on a tripod, whereby an image stabilizing operation is discontinued when the camera is determined to be in a fixed state. However, even when the camera is mounted on a tripod sources of image blur still exist, such as a tremble caused by a release operation. Therefore, when the image-stabilizing operation is suspended in the fixed state, an image blur resulting from a release operation and the like may occur even when a camera is stationary. Accordingly, there is also provided a camera in which an image-stabilizing operation is carried out at relatively low sensitivity when the camera is determined to be fixed on a tripod (U.S. Pat. No. 7,505,217).

SUMMARY OF THE INVENTION

In a conventional camera, whether the camera is in a fixed state or not is determined only once when a release operation is started. Thus if a camera is held by hand in a very stable manner when the above determination is carried out, a fixed mode could be selected even the camera is held in an operator's hands. In such case, the image-stabilizing operation may be turned off or restrained. On the other hand, an image-stabilizing mode, in which the image-stabilizing operation is carried out, could be selected even when the camera is mounted on a tripod if a tremble caused by a release operation is detected.

Therefore, one aspect of the present invention is to provide an apparatus that is able to determine swiftly and accurately whether or not the camera is in a fixed state at the time of exposure in order to select an appropriate drive mode.

According to the present invention, an image-stabilization apparatus is provided that includes an image stabilizer and a status-determining processor.

The image stabilizer counterbalances a camera shake in accordance with sensor signals from a shake-detecting sensor. The status-determining processor determines whether the status of the camera is in a fixed state or in a non-stationary state on the basis of the signals. The status determination process is carried out at the time of exposure and the characteristics of an image-stabilizing operation are altered according to the results of the status determination process.

The status determination process may count the number of times the sensor signals are within a predetermined range of signal threshold values and may compare the number counted with a predetermined count threshold value.

The status determination process may use a plurality of threshold values and conditions.

The sensor signals may be detected in regard to first and second axes, the image-stabilizing operation may be performed for each of the first and second axes, and the characteristics of the first and second axes may be altered according to the results of the status determination process for one of the first and second axes.

When the results of the status determination process at time of exposure are biased toward one of the fixed state or the non-stationary state, the status determination process may be suspended and the characteristics may be fixed to the present status.

Different filters may be applied to the sensor signals when performing the status determination process and when calculating a magnitude of correction in the image-stabilizing operation.

The status-determining processor may carry out an initial status determination process with reference to the latest N number of the sensor signals, and then whether or not values of the sensor signals are within a predetermined range of signal threshold values at exposure time may be counted. Further, the number counted may be compared to a predetermined count threshold value to determine whether or not the status has changed from one state to the other.

The count threshold value may be selected in accordance with a result of the initial status determination process.

Whether the non-stationary state has changed to the fixed state is determined according to a combination of a plurality of counted sensor signals and corresponding count threshold values.

A determination of a change from the non-stationary state to the fixed state may be carried out under stricter criteria than a determination of a change from the fixed state to the non-stationary state.

According to another aspect of the present invention, a camera with the above image-stabilization apparatus is provided.

Further, according to another aspect of the present invention, an image-stabilizing method is provided that includes steps of counterbalancing a camera shake in accordance with sensor signals from a shake-detecting sensor, determining whether a status of the camera is in a fixed state or in a non-stationary state on the basis of the signals, and carrying out a status determination process at time of exposure so that characteristics of an image-stabilizing operation can be altered according to the results of the status determination process.

BRIEF DESCRIPTION OF THE DRAWINGS

The objects and advantages of the present invention will be better understood from the following description with references to the accompanying drawings in which.

DESCRIPTION OF THE PREFERRED EMBODIMENTS

Figure 1:
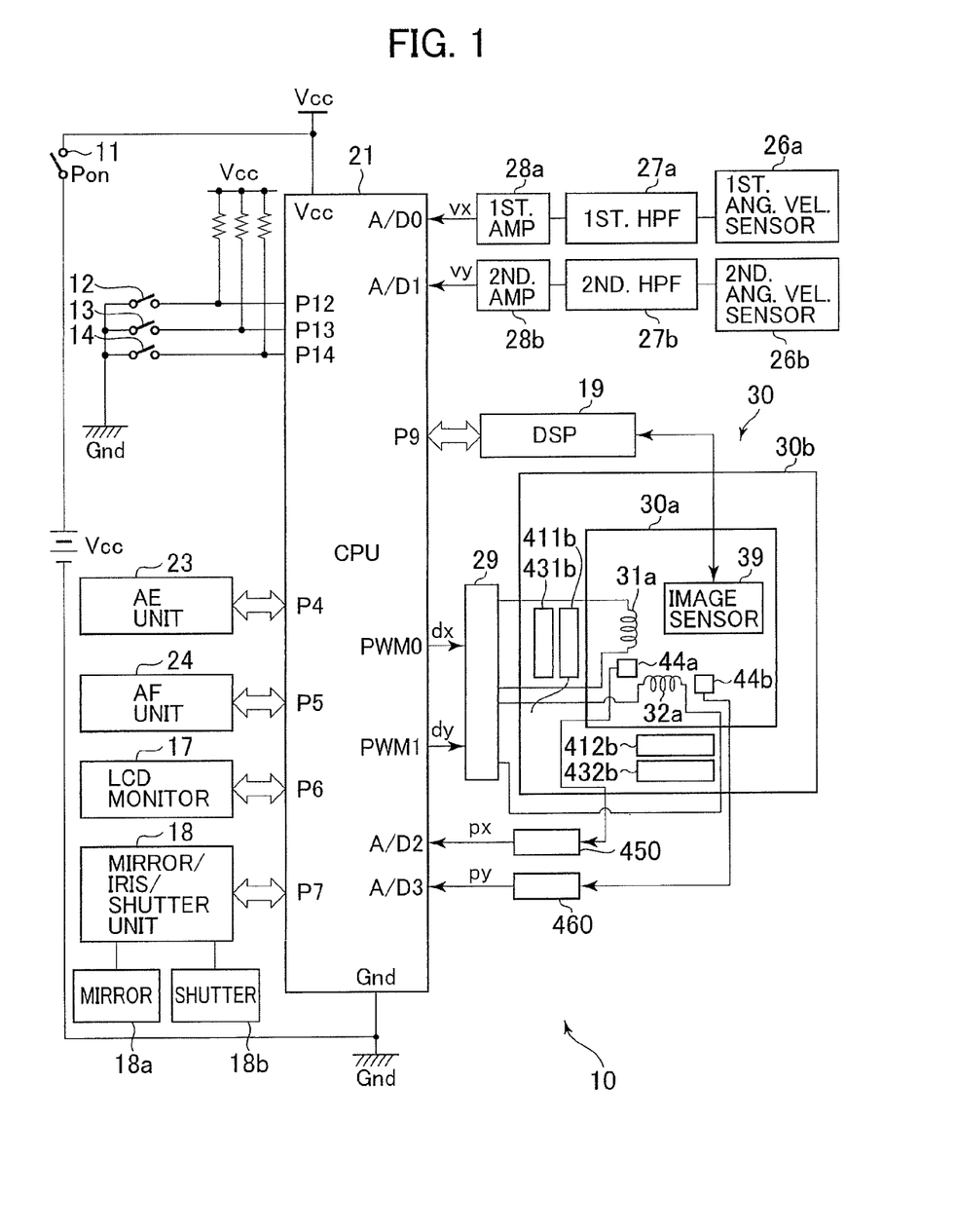
FIG. 1 is a block diagram illustrating an electrical structure of a digital camera of the present embodiments.

The present invention is described below with references to the embodiments shown in the drawings. FIG. 1 is a block diagram illustrating an electrical structure of a digital camera to which the present invention is applied.

The digital camera 10 is mainly controlled by a CPU 21. When a power switch 11 is turned on, electric power is supplied to the CPU 21 and to devices provided inside the digital camera 10 from a power supply Vcc. A photometry switch 12, a release switch 13 and an image stabilization (shake reduction) switch 14 are connected to ports P12, P13 and P14, respectively.

When the photometry switch 12 is turned on, an AE unit 23 and an AF unit are driven so that a photometry operation and an autofocus operation are carried out, as is well known. When the release switch 13 is turned on, a mirror/iris/shutter unit 18 is driven. Namely, a mirror (not shown) is swung up, a mechanical shutter (not shown) is released, and an image is captured by an image sensor 39. The image sensor 39 is driven by a DSP 19 and image signals obtained by the image sensor 39 are processed by the DSP 19. For example, the image signals, which have been processed by the DSP 19, are input to the CPU 21 via a port P9 and further output to an LCD monitor 17 via a port P6.

The digital camera 10 may include an image stabilization mechanism 30 of the sensor-shift type to counterbalance or compensate for a camera shake. The image stabilization mechanism 30 is controlled with reference to signals from sensors detecting a tremble of the camera body, such as a first angular velocity sensor 26a that detects an angular velocity about a horizontal axis (X) and a second angular velocity sensor 26b that detects an angular velocity about a vertical axis (Y). For example, angular velocity signals detected by the first and second angular velocity sensors 26a and 26b are input to A/D ports A/D0 and AD1 of the CPU 21 via first and second high-pass filters 27a and 27b and first and second amplifiers 28a and 28b, respectively, and then converted into digital signals vx and vy.

The angular velocity signals vx and vy are then subjected to a digital high-pass filter and integrated so that the rotated angles about the X-axis and Y-axis are calculated. Further, a shift position (the amount of correction) of the movable portion 30a (or the image sensor 39) is calculated from the rotated angles about the X- and Y-axes and focal length, and manipulated variables dx and dy for the image stabilization mechanism 30 in the directions along the X- and Y-axes are calculated via PID calculations based on the above-calculated shift position and current position of the image sensor 39 detected by Hall effect sensors 44a and 44b. The manipulated variables dx and dy are fed to a driver 29 via PWM (pulse width modulation) ports PWM0 and PWM1. The driver 29 supplies current corresponding to the manipulated variables dx and dy to coils 31a and 32a, respectively.

For example, the image stabilization mechanism 30 includes the image sensor 39, a movable portion 30a with coils 31a and 32a, and a fixed portion 30b with magnets 411b and 412b and yokes 431b and 432b. Further, signals from the Hall effect sensors 44a and 44b are converted to positional signals px and py, which indicate coordinates of the image sensor 39 at the present position, through first and second Hall-effect sensor-signal processors 450 and 460, and input to the CPU 21 via AD ports A/D2 and A/D3.

Next, with reference to FIGS. 1, 2 and the flowchart of FIG. 3, a status-determining process of a first embodiment, which determines whether a camera is in a fixed state or not, will be explained.

Figure 2:
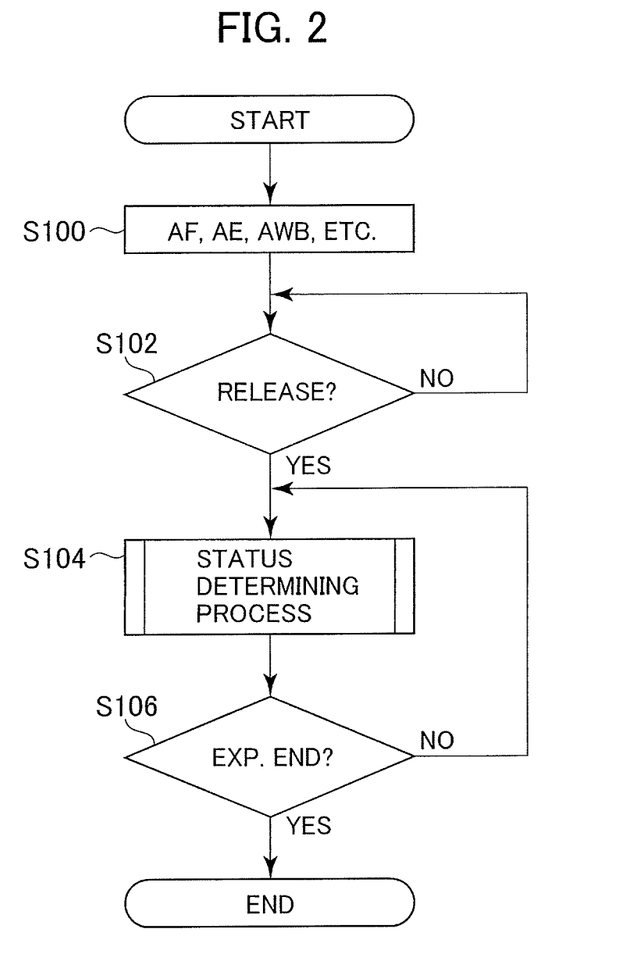
FIG. 2 is a flowchart of a process carried out by a CPU in a first embodiment when a photometric switch is turned on while an image stabilization process is in effect.

The process described in the flowchart of FIG. 2 is carried out by the CPU 21, for example, while a release button (not shown) is halfway depressed and the photometry switch 12 is turned on when the image stabilization switch 14 is in the ON state. When the photometry switch 12 is turned on, an autofocus (AF) process, an auto photometry (AE) process and an auto white balance (AWB) process, which are well known, are carried out in Step S100. Then in Step S102, whether the release switch 13 is turned on or not is continuously evaluated until the release switch 13 is actually turned on. When it is determined that the release switch has been turned on, the process proceeds to Step S104 and the status-determining process (a mode-altering process), which will be detailed later, is carried out. Incidentally, when the release switch 13 is turned on, a release operation is also carried out and exposure of the image sensor 39 is started.

In the status-determining process of Step S104, the present status of the camera is determined, as detailed later, and the image-stabilizing operation is turned on or turned off, accordingly. Next, in Step S106, whether the exposure of the image sensor 39 has been finished is determined. If the exposure has not been finished, the status-determining process of Step S106 is repeated. On the other hand, when the exposure of the image sensor 39 has already been completed, this process ends.

Figure 3:
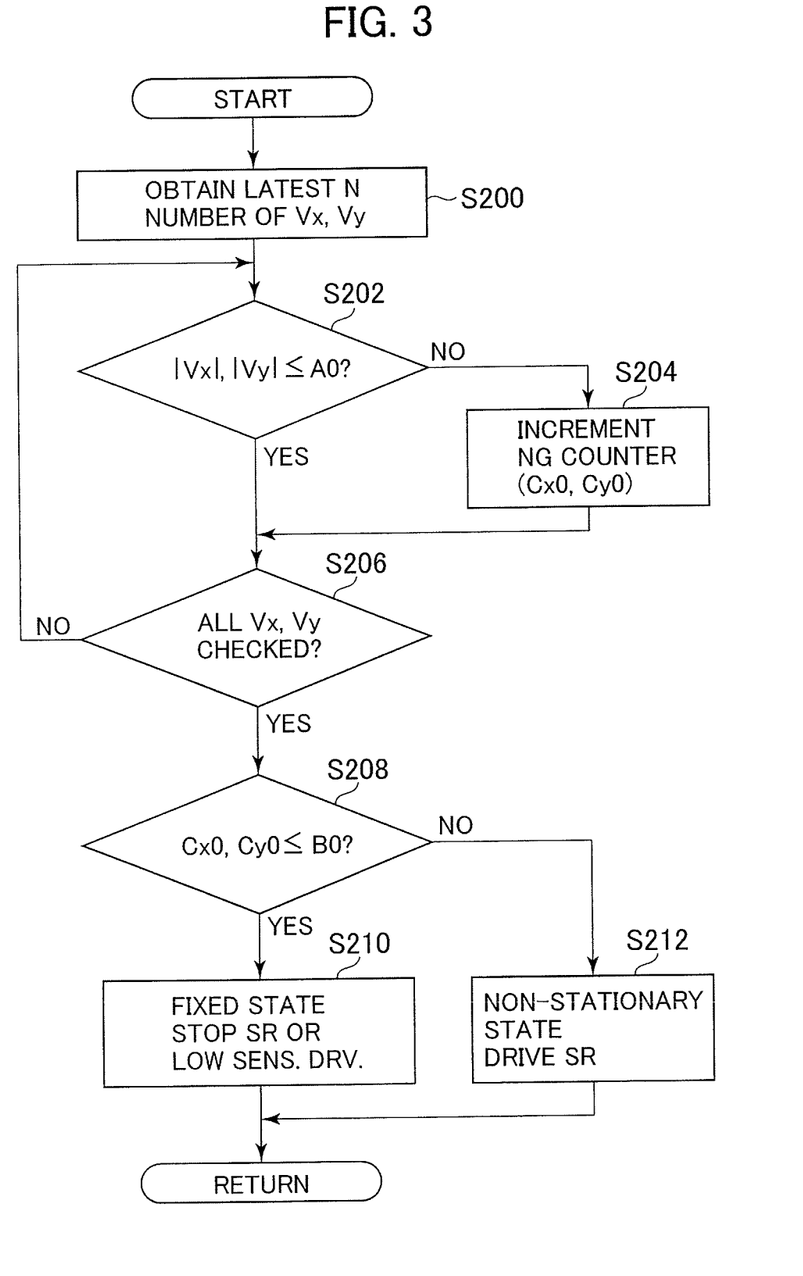
FIG. 3 is a flowchart of a status-determining process of the first embodiment.

FIG. 3 is a flowchart of the status-determining process (which includes a drive-mode altering process) carried out in Step S104 of FIG. 2. In the status-determining process, a certain number (N) of signals (angular velocity) from the angular velocity sensors (gyroscopes) 26a and 26b, which correspond to signals issued over a period of time up until the present time, are first obtained in Step S200. Note that the latest N (e.g., 100-300; in the present embodiment 200) signals from each of the angular velocity sensors 26a and 26b are regularly retained when the power switch 11 is ON.

In Steps S202-S206, whether N number of output signals Vx and Vy from the angular velocity sensors (gyroscopes) 26a and 26b, which are signals that have already been subjected to a digital filtering process in the CPU 21, are within a range of a predetermined threshold value A0 (>0) or not is determined. Namely, whether or not the absolute values of the output signals (angular velocity) Vx and Vy, such as |Vx| and |Vy|, are equal to or less than A0 is determined. When the output signals Vx or Vy are determined to be outside the range of A0, an NG counter assigned to such an output signal or sensor is incremented by one. Note that the value of an NG counter assigned to an output signal (or sensor) that is determined to be within the range of A0 is not altered.

In the present embodiment, the output signals Vx and Vy from the angular velocity sensors (gyroscopes) 26a and 26b are individually evaluated. When denoting an NG counter for signals from the angular velocity sensor 26a by Cx0 and an NG counter for signals from the angular velocity sensor 26b by Cy0, the value of Cx0 is retained and only the value of Cy0 is incremented by one in Step S204 when |Vx|≤A0 and |Vy|>A0.

In Step S206, whether or not the processes of Steps S202-S204 are performed for all N number of the latest signals (data) for each set of output signals Vx and Vy is determined. When these processes have not been performed for all of the signals, the process returns to Step S202 so that the above-mentioned processes are performed on the next output signals Vx and Vy.

On the other hand, when it is determined in Step S206 that the above-mentioned processes have already been performed for all N number of respective output signals Vx and Vy, the process proceeds to Step S208 and whether the NG count values Cx0 and Cy0 are less than or equal to a threshold value B0 or not is determined. Namely, it is determined whether the number of times each output signal Vx and Vy exceeds the range of the threshold value A0 is less than or equal to the threshold value B0.

When both of the NG count values Cx0 and Cy0 are less than or equal to the threshold B0, the process proceeds to Step S20 and the camera is determined to be held in a fixed state so that the drive mode is set to a fixed mode and thus this status-determining process ends. In the fixed mode, the image-stabilizing (shake reduction) operation is turned off or operated under low sensitivity. Incidentally, when the image stabilization is operated under at low sensitivity, gains applied to the output signals Vx and Vy are set to a relatively small value compared to those of the normal image-stabilizing operation. Further, the OFF state of the image-stabilizing operation may be represented by a situation when the gain is set to zero.

On the other hand, when it is determined in Step S208 that either of the NG count values Cx0 and Cy0 exceed the range of threshold value B0, the process proceeds to Step S212 and the camera is determined to be held in hand, which may be referred to as a non-stationary state, and the normal image-stabilizing (shake reduction) operation is continued or started. Namely, an image-stabilizing mode that performs the normal image-stabilizing (shake reduction) operation is selected as the drive mode and this status-determining process ends.

Note that in the present embodiment, a filter(s) applied to the output signals (angular velocity signals) Vx and Vy when performing the status-determining process is not the same as a filter(s) applied to the angular velocity signals when calculating the magnitude of shift for the movable portion 30a (or image sensor 39) in the image-stabilizing operation. For example, a combination of a median filter, a high-pass filter and a low pass filter may be applied when performing the status-determining process while only a relatively low intensity high-pass filter is applied to the output signals when calculating the magnitude of shift of the image sensor (the movable portion).

Therefore, according to the first embodiment, signals from the angular velocity sensors, i.e., the status of the camera, are regularly monitored even after the release switch is turned on until the completion of exposure, so that the image-stabilizing operation can be switched to an appropriate status at time of exposure even when the camera's status has been inaccurately determined at the release operation. Further, in the present embodiment, if one of the NG count values Cx0 or Cy0 exceeds the threshold value B0, the drive mode can be adjusted to the image-stabilizing mode, whereas the mode is not able to switch to the fixed mode unless both of the NG count values Cx0 and Cy0 are less or equal to the threshold value B0. Therefore, switching from the image-stabilizing mode to the fixed mode occurs under relatively stricter criteria than switching the opposite way.

Note that although in the present embodiment, the same threshold value B0 is applied to the NG count values Cx0 and Cy0, different threshold values can also be used for each of the NG count values.

Figure 4A:
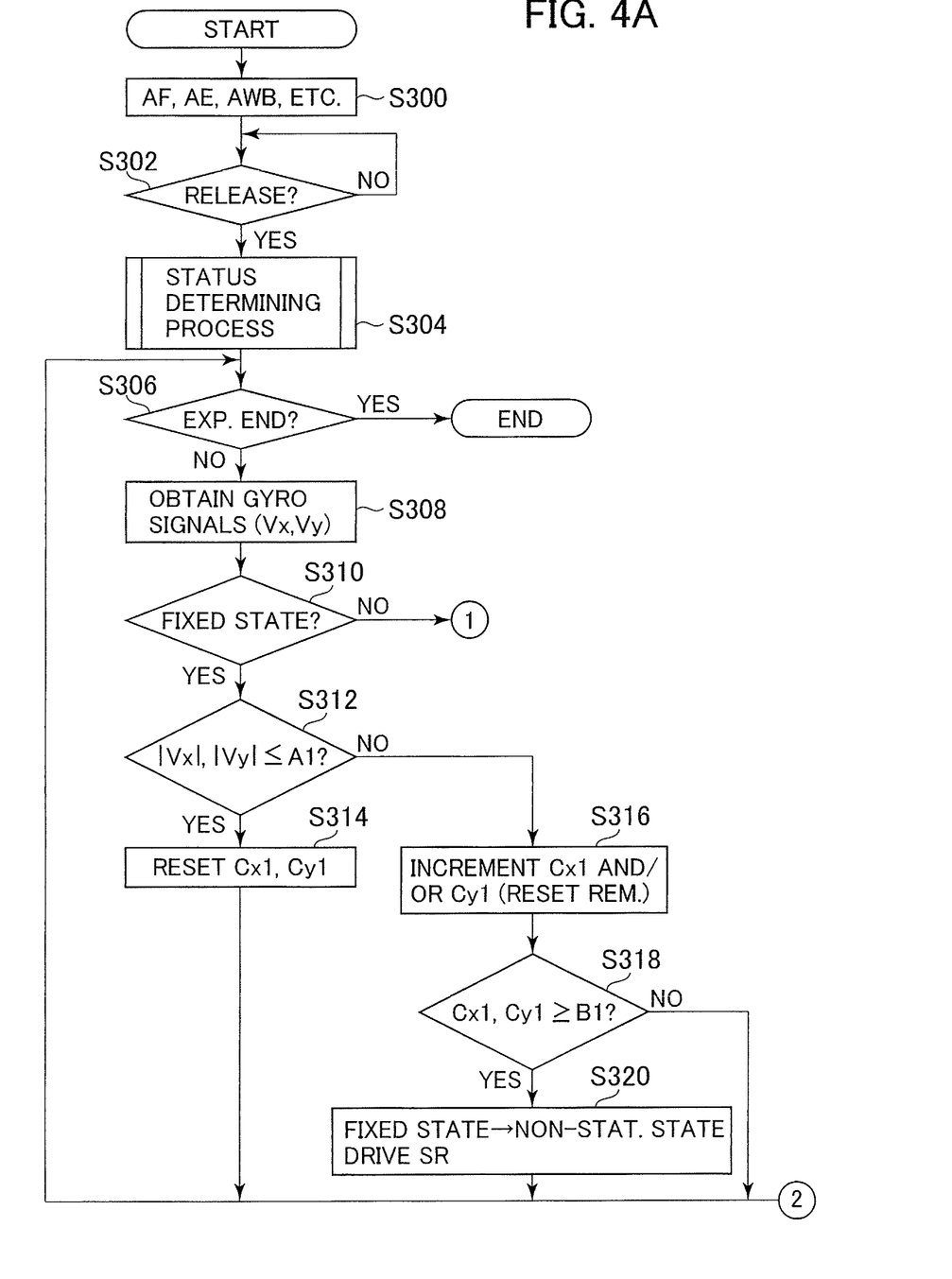
FIGS. 4A and 4B are a flowchart of a process carried out by a CPU in a second embodiment when a photometric switch is turned on while an image stabilization process is in effect.
Figure 4B:
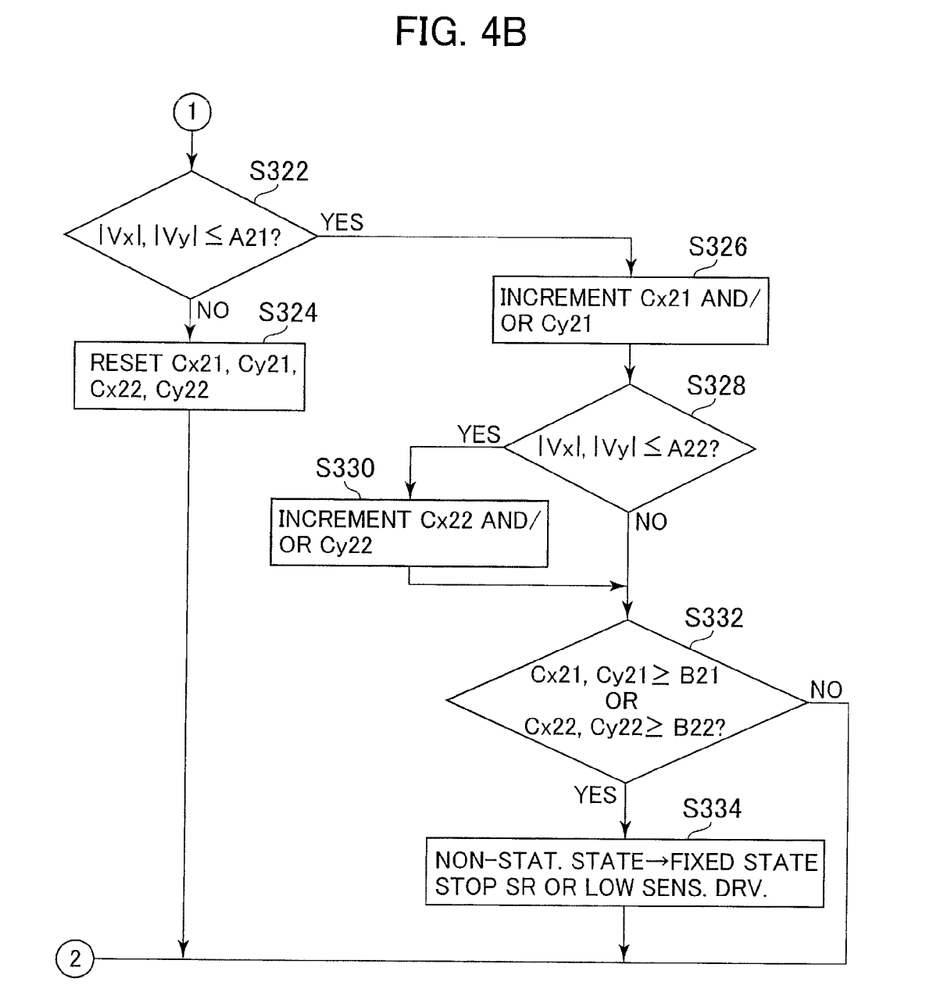

With reference to FIGS. 4A and 4B, a mode-altering process of the second embodiment will be explained. Although the status-determining process in the first embodiment is repeated for all N signal outputs of the gyroscopes, which are renewed regularly in the second embodiment, the status-determining process described in the flowchart of FIG. 3 is carried out only once, just after a release operation. Thereafter, the status of the camera is evaluated by other measures that require a lower load. Note that the other structures are the same as those in the first embodiment; therefore an explanation will be omitted.

FIGS. 4A and 4B are flowcharts that correspond to FIG. 2 of the first embodiment. In the second embodiment, the process starts when the release button (not shown) is halfway depressed to turn on the photometry switch 12. Incidentally, Steps S300-S304 correspond to Steps S100-S104 of FIG. 2; therefore they will be not explained.

When the release operation is performed and the status-determining process of FIG. 2 is completed in Step S304, i.e., when Step S210 or Step S212 of FIG. 3 is executed, whether an exposure of the image sensor 39 has been completed or not is determined in Step S306. If the exposure has been completed, this process will end immediately, otherwise current output signals from the angular velocity sensors (gyroscopes) 26a and 26b are obtained and NG count values Cx1, Cy1, Cx21, Cy21, Cx22 and Cy22 are all reset to their initial values (e.g. zero).

In Step S310, whether the current mode is set to the fixed mode or not is determined. When the current mode is determined to be set to the fixed mode, the process proceeds to Step S312 and it is further determined whether the signals Vx and Vy output from the gyroscopes are within a range of a predetermined threshold value A1 (>0). Namely, whether the absolute values |Vx| and |Vy| of the output signals Vx and Vy, which are obtained in Step S308, are A1 or less is determined.

For example, the threshold value A1 is set to a value around 2-10 and may be adjustable in accordance with the mode selected in the status-determining process, which is performed in Step S304. For example, when the fixed mode is selected in Step S304, a relatively large value may be set as the threshold value A1 while a relatively small value is set as the threshold value A1 when the image-stabilizing mode is selected.

When the signals Vx and Vy output from the gyroscopes 26a and 26b are both determined to be within the range of the threshold value A1 in Step S312, then the NO count values Cx1 and Cy1 are both reset and the process returns to Step S306 while maintaining the fixed mode.

On the other hand, when it is determined in Step S312 that at least one of the output signals Vx or Vy is not in the range of the threshold value A1, the process proceeds to Step S316 and an NG count value Cx1 and/or Cy1 that is assigned to output signal Vx and/or Vy that has exceeded the range of the threshold value A1 is incremented by one (+1) while the rest of the NG counts are reset. Then the process proceeds to Step S318 and it is determined whether or not the NG count values Cx1 and Cy1 exceed a threshold value B1. Note that the respective NG count values Cx1 and Cy1 represent the number of times in which the output signals Vx or Vy continuously exceeded the range of the threshold value A1 at the time of exposure in the fixed mode.

When it is determined in Step S318 that either of the NG count values Cx1 or Cy1 exceeded the threshold value B1, it is likely that the camera has been moved to a situation where a tremble is apt to occur; therefore the drive mode is switched to the image-stabilizing mode and in turn the image-stabilizing (shake reduction) operation is activated. On the other hand, when it is determined in Step S318 that both of the NG count values Cx1 and Cy1 are within the range of the threshold value B1, the fixed mode, which is currently chosen, is maintained and the process returns to Step S306.

Further, it is determined in Step 310 that the current mode is not set as the fixed mode, i.e. the current mode is determined to be the image-stabilizing mode and the process proceeds to Step S322 where it is determined whether the output signals Vx and Vy from the gyroscopes 26a and 26b are within the range of a predetermined threshold value A21 (>0). Namely, it is determined whether or not the absolute values of the output signals Vx and Vy, such as |Vx| and |Vy|, are A21 or less.

When both of the output signals Vx and Vy exceed the range of the threshold value A21, the process proceeds to Step S324 and the NG count values Cx21, Cy21, Cx22 and Cy22 are reset. Further, the process returns to Step S306 and the present image-stabilizing mode is maintained.

On the other hand, when it is determined in Step S322 that either of the output signals Vx and Vy is within the range of the threshold value A21, the process proceeds to Step S326 and an NG count value Cx21 and/or Cy21 that is assigned to the output signal Vx and/or Vy that is within the range of the threshold value A21 is incremented by one (+1). Further, in Step S328, it is determined whether or not the values of the output signals Vx and Vy are within a range of a threshold value A22 (<A21). Namely, it is determined whether or not the absolute values of the signal outputs Vx and Vy, such as |Vx| and |Vy|, are A22 or less.

When it is determined in Step S328 that either of the output signals Vx and Vy is within the range of the threshold value A22, the process proceeds to Step S330 and an NG count value Cx22 and/or Cy22 that is assigned to the output signal Vx and/or Vy that is within the range of the threshold value A22 is incremented by one (+1), and in turn Step S332 is performed. However, when both of the output signals Vx and Vy exceed the range of the threshold value A22, Step S332 is directly performed without renewing any of the NG count values Cx22 and Cy22. Incidentally, an NG count value Cx22 and Cy22 that exceeds the threshold value A22 may be reset in Steps S330 and/or S332. In such case, the NG count values Cx22 and Cy22 represent the number of times in which the output signals Vx and Vy consecutively remain within the range of the threshold value A22.

In Step S332, whether both of the NG count values Cx21 and Cy21 are greater than or equal to a predetermined threshold value B21 or whether both of the NG count values Cx22 and Cy22 are greater than or equal to a predetermined threshold value B22 (<B21) is determined. When the above conditions for Step S332 are not satisfied, the process returns to Step S306 and the present image-stabilizing mode is maintained. On the other hand, when the above conditions are satisfied, it can be regarded that the status of the camera changed to the fixed state, so that the image-stabilizing (or shake reduction) operation is terminated or the drive mode is adjusted to the fixed mode that drives the image-stabilizing system at relatively low sensitivity, and then the process returns to Step S306. Note that the above-mentioned processes are repeated until the exposure is completed.

The reason why two pairs of NG count values (Cx21, Cy21) and (Cx22, Cy22) are employed is to improve the accuracy of the determination concerning whether the camera status has been adjusted from a probable tremble status (non-stationary state), such as when the camera is held in a user's hands, to a fixed state. The NG count values Cx21 and Cy21 represent the number of times in which the output signals Vx and Vy fall within the range of the threshold value A21 at the time of exposure in the image-stabilizing mode. The NG count values Cx22 and Cy22 represent the number of times in which the output signals Vx and Vy are within the range of the threshold value A22 (<A21) at the time of exposure in the image-stabilizing mode. Further, the threshold values B21 and B22 may be selected from values between 50 and 100. Incidentally, in the present embodiment, the order of the threshold values may be selected as A0>A1>A21>A22>0 and B21>B22.

As described above, according to the second embodiment of the present invention, similar effects as obtained in the first embodiment can be obtained. In the first embodiment, N signals output from the gyroscopes, which are renewed in turn at the time of exposure, are repeatedly monitored. However, in the second embodiment, N signals output are evaluated only once and after that only the current or latest output signal is renewed to significantly reduce the CPU load. Further, in the present embodiment, the criteria for altering the drive mode from the image-stabilizing mode to the fixed mode is relatively more severe than altering the drive mode the opposite way. Therefore, the drive mode may not be changed to the fixed mode unintentionally. Further, in the present embodiment, a different pair of counters is used in each of two determination processes that adjust the drive mode from the image-stabilizing mode to the fixed mode so that it can be correctly determined whether or not the camera is in a fixed state.

Figure 5A:
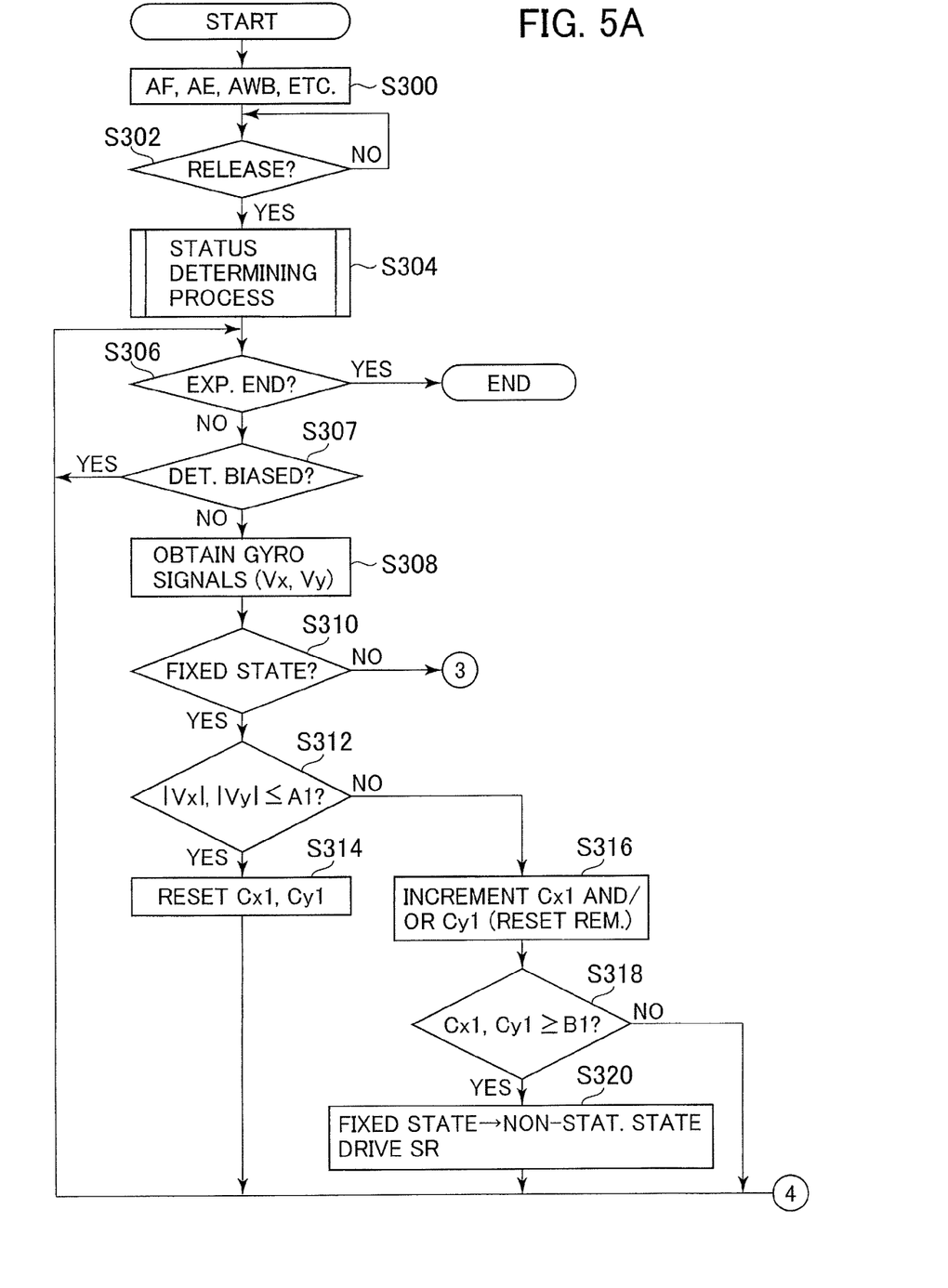
FIGS. 5A and 5B is a flowchart of a process carried out by a CPU in an alternative of the second embodiment when a photometric switch is turned on while an image stabilization process is in effect.
Figure 5B:
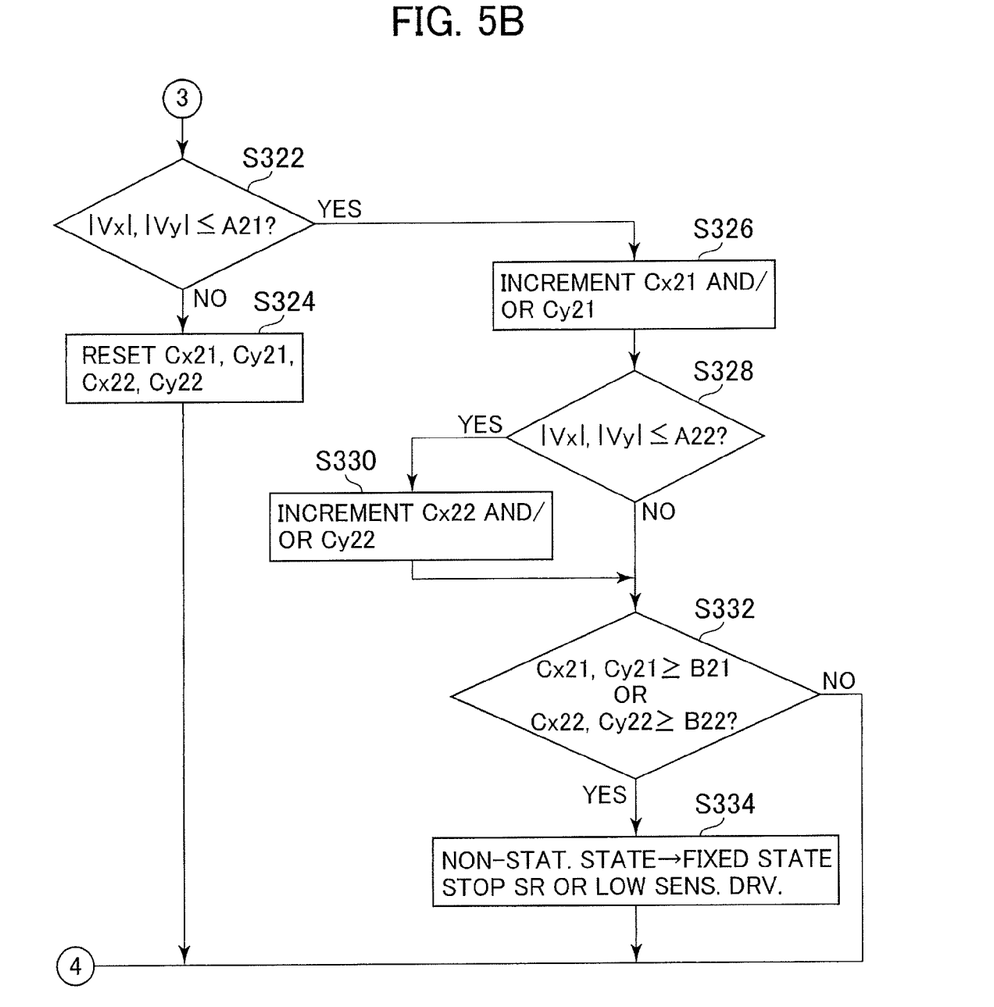

Next, with reference to the flowcharts of FIGS. 5A and 5B, an alternative version of the second embodiment is explained. In this alternative embodiment, the drive mode is fixed to the current mode when the results of the determination as to whether the camera is in the fixed state or in the non-stationary state (hand-held state) are biased toward either state at a certain rate with respect to the exposure time or biased toward either state for a predetermined time, and after that the status determination process is not performed.

FIGS. 5A and 5B correspond to the flowcharts of FIGS. 4A and 4B of the second embodiment. However, Step S307 is added between Step S306 and Step S308. Since the other structures of the alternative embodiment are the same as those in the second embodiment, their explanation has been omitted. As illustrated in FIG. 5A, whether the exposure has been completed is determined in Step S306. When it is determined that the exposure has not been finished, the process proceeds to Step S307 where it is determined if the determination results are biased toward the fixed state or the probable tremble state (non-stationary state). In the present embodiment, the deviation may be evaluated by a ratio of the time the results take place to an exposure time, which correspond to a shutter speed. Namely, it is determined whether or not either one of the fixed mode or the image-stabilizing mode has continued for more than a predetermined time. When there is no deviation, the processes of Steps S308-S334, which are explained with reference to FIGS. 4A and 4B, are carried out; otherwise, the process returns to Step S306 and the present mode is maintained and the same determination process is repeated until the exposure ends.

As described above, according to the alternative embodiment of the present invention, effects similar to those obtained in the second embodiment can be obtained. Additionally, the CPU load is further reduced.

Although in the present embodiments, the same threshold value A0 is employed for both of the output signals Vx and Vy (movements in the vertical direction and the horizontal direction), the same threshold value A1 for the output signals Vx and Vy, and the same threshold value A2 for the output signals Vx and Vy, different values can also be used for each of the signal outputs Vx and Vy. Further, only signals output from one gyroscope may be monitored. Although, in the second embodiment, the NG count values are reset when the signals output from the gyroscopes are within (e.g., S312) or outside of the range (e.g., S322 and S328), the NG count values may be decremented by a predetermined value.

In the present embodiments, the description is made for a single reflex digital camera. However, the present invention can also be applied to any types of camera, such as a silver halide camera, a compact camera and the like. Further, although in the present embodiment, an image-sensor-shift type is employed as the image stabilization system, a lens-shift type can also be used. In the present embodiments, angular velocity signals are monitored to determine the status of the camera. However, angle signals, which are integrals of the angular velocity signals, may also be monitored to determine the status.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2012-229893 (filed on Oct. 17, 2012), which is expressly incorporated herein, by reference, in its entirety.

The invention claimed is:

1. An image-stabilization apparatus, comprising:
   an image stabilizer that performs an image-stabilizing operation to counterbalance a camera shake in accordance with sensor signals from a shake-detecting sensor; and
   a status-determining processor that performs a status determination process to determine whether a status of the camera is in a fixed state or in a non-stationary state on the basis of the signals;
   the status determination process being performed during an exposure period and characteristics of the image-stabilizing operation being altered according to results of the status determination process,
   wherein the status-determining processor performs an initial status determination process to determine whether an initial status of the camera is in the fixed state or in the non-stationary state, and
   the status-determining processor performs a second status determination process to determine whether the initial status has changed to an other status,
   wherein the second status determination process is changed depending on whether the initial status is determined in the fixed state or in the non-stationary state, and
   wherein the status-determining processor performs the initial status determination process with reference to a latest N number of the sensor signals at a beginning of the exposure period, and then, in the second status determination process, the status-determining processor counts a number of times the values of the sensor signals are within a predetermined range of signal threshold values during the exposure period, and compares the counted number with a predetermined count threshold value to determine whether or not the initial status has changed to the other status.

2. The image-stabilization apparatus according to claim 1, wherein the initial status determination process comprises counting the number of times the sensor signals are within a predetermined range of signal threshold values and comparing the number counted with a predetermined count threshold value.

3. The image-stabilization apparatus according to claim 1, wherein the second status determination process uses different threshold values and conditions, depending on whether the initial status is in the fixed state or in the non-stationary state.

4. The image-stabilization apparatus according to claim 1, wherein the sensor signals are detected in regard to first and second axes, the image-stabilizing operation is performed for each of the first and second axes, and the characteristics related to the first and second axes are altered according to the results of the status determination process for one of the first and second axes.

5. The image-stabilization apparatus according to claim 1, wherein when the results of the second status determination process during the exposure period are biased toward one of the fixed state or the non-stationary state, the status determination process is suspended and the characteristics are fixed to the present status.

6. The image-stabilization apparatus according to claim 1, wherein filters applied to the sensor signals when performing the status determination process are different from filters applied when calculating a magnitude of correction in the image-stabilizing operation.

7. The image-stabilization apparatus according to claim 1, wherein the count threshold value is selected in accordance with a result of the initial status determination process.

8. The image-stabilization apparatus according to claim 1, wherein whether the non-stationary state has changed to the fixed state is determined according to a combination of a plurality of counted sensor signals and corresponding count threshold values.

9. The image-stabilization apparatus according to claim 1, wherein a determination of a change from the non-stationary state to the fixed state is made based on stricter criteria than a determination of a change from the fixed state to the non-stationary state.

10. The image-stabilization apparatus according to claim 1, wherein the initial status determination process uses threshold values and conditions different from threshold values and conditions used in the second status determination process.

11. The image-stabilization apparatus according to claim 1, wherein the status-determining processor performs the second status determination process with reference to current sensor signals.

12. A camera provided with an image-stabilization apparatus, the image-stabilization apparatus comprising:
   an image stabilizer that performs an image-stabilizing operation to counterbalance a camera shake in accordance with sensor signals from a shake-detecting sensor; and
   a status-determining processor that performs a status determination process to determine whether a status of the camera is in a fixed state or in a non-stationary state on the basis of the signals;
   the status determination process being performed during an exposure period and characteristics of the image-stabilizing operation being altered according to results of the status determination process,
   wherein the status-determining processor performs an initial status determination process to determine whether an initial status of the camera is in the fixed state or in the non-stationary state, and
   the status-determining processor performs a second status determination process to determine whether the initial status has changed to an other status, wherein the second status determination process is changed depending on whether the initial status is determined in the fixed state or in the non-stationary state, and wherein the status-determining processor performs the initial status determination process with reference to a latest N number of the sensor signals at a beginning of the exposure period, and then, in the second status determination process, the status-determining processor counts a number of times the values of the sensor signals are within a predetermined range of signal threshold values during the exposure period, and compares the counted number with a predetermined count threshold value to determine whether or not the initial status has changed to the other status.

13. An image-stabilizing method comprising:

performing an image-stabilizing operation to counterbalance a camera shake in accordance with sensor signals from a shake-detecting sensor;

performing, during an exposure period, a status determination process to determine whether a status of the camera is in a fixed state or in a non-stationary state on the basis of the signals; and altering characteristics of the image-stabilizing operation according to results of the status determination process, wherein the status determination process including an initial status determination process that determines whether an initial status of the camera is in the fixed state or in the non-stationary state, and a second status determination process that determines whether the initial status has changed to an other status, wherein the second status determination process is changed depending on whether the initial status is determined in the fixed state or in the non-stationary state, and wherein the initial status determination process is performed with reference to a latest N number of the sensor signals at a beginning of the exposure period, and then, in the second status determination process, a number of times the values of the sensor signals are within a predetermined range of signal threshold values during the exposure period are counted, and the counted number is compared with a predetermined count threshold value to determine whether or not the initial status has changed to the other status.

14. An image-stabilization apparatus comprising:

an image stabilizer that counterbalances a camera shake in accordance with sensor signals from a shake-detecting sensor; and a status-determining processor determining whether a status of the camera is in a fixed state or in a non-stationary state on the basis of the signals;

a status determination process being carried out at time of exposure and characteristics of an image-stabilizing operation being altered according to results of the status determination process, wherein the status-determining processor performs an initial status determination process with reference to a latest N number of the sensor signals and then a number of times the values of the sensor signals are within a predetermined range of signal threshold values at time of exposure time are counted, and the number counted is compared to a predetermined count threshold value to determine whether or not the status has changed from one state to the other.

15. The image-stabilization apparatus according to claim 14, wherein the count threshold value is selected in accordance with a result of the initial status determination process.

16. The image-stabilization apparatus according to claim 15, wherein whether the non-stationary state has changed to the fixed state is determined according to a combination of a plurality of counted sensor signals and corresponding count threshold values.

* * * * *